June 2, 1936.   A. L. MILLER ET AL   2,042,478
PRODUCTION OF BISULPHITE LIQUOR
Filed Dec. 21, 1934
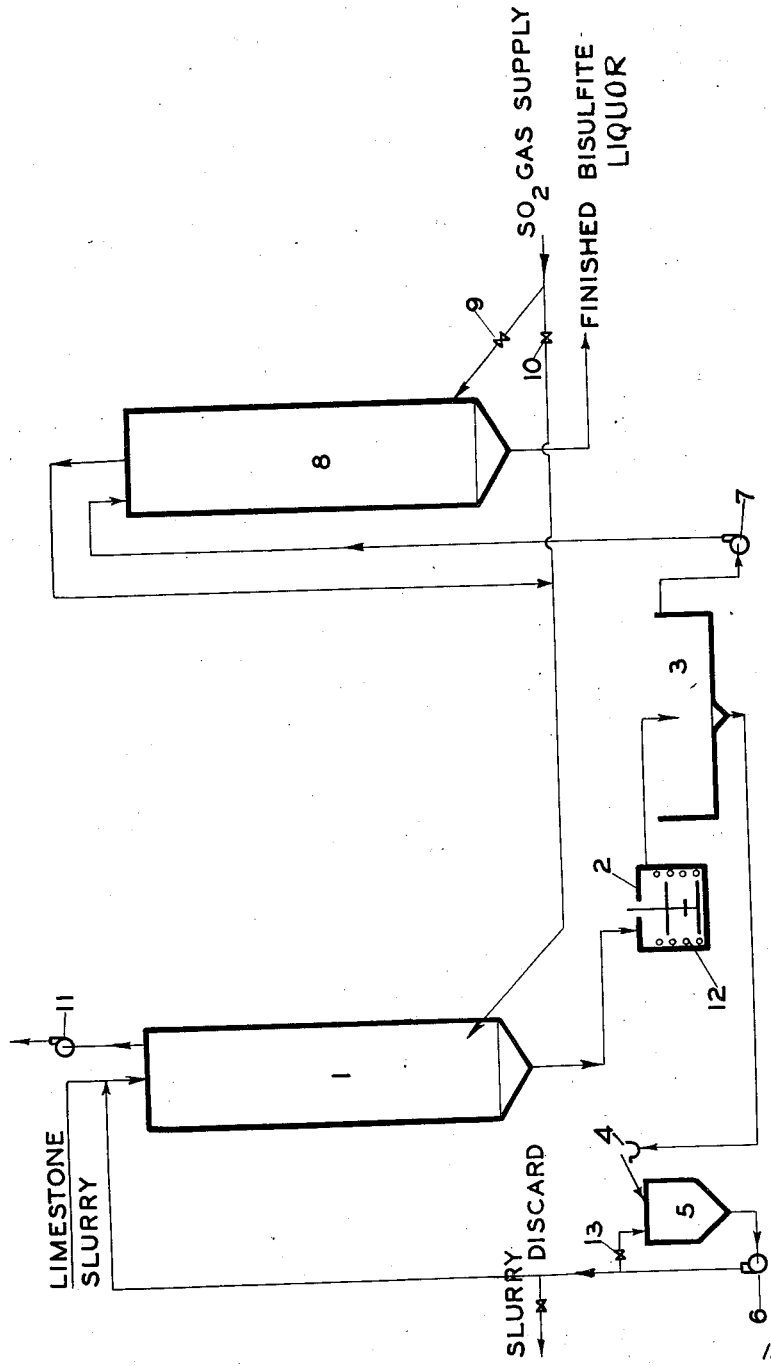
INVENTORS.
ALVAH L. MILLER.
RALPH W SHAFOR.
GEORGE M. DARBY.
BY Antaun Middleton
ATTORNEY.

Patented June 2, 1936

2,042,478

UNITED STATES PATENT OFFICE 2,042,478

PRODUCTION OF BISULPHITE LIQUOR

Alvah L. Miller, North Tarrytown, and Ralph W. Shafor, New York, N. Y., and George M. Darby, Westport, Conn., assignors to The Dorr Company, Inc., New York, N. Y., a corporation of Delaware Application December 21, 1934, Serial No. 758,580

6 Claims. (Cl. 23—130)

This invention relates to methods for producing bi-sulphite liquor such as is used as a reagent in the digestion of wood and other materials to yield a cellulose pulp. More particularly it pertains to certain improvements especially applicable in connection with the process of making bi-sulphite liquor as set forth in United States application for patent Serial No. 515,266 by Miller and Darby.

This invention has for its primary objective the attainment of an improved control over the composition of bi-sulphite liquor as produced by the process set forth in the above mentioned application for patent.

In the present state of the art as it is generally practised, and in the process set forth in the above mentioned application for patent, bi-sulphite liquor is produced by processes involving two principal steps. In the first of these limestone, water and $SO_2$ are caused to react to produce essentially a clear solution containing $Ca(HSO_3)_2$ and, relative thereto, varying amounts of "free" or unbound $SO_2$. In a second step this clear solution is further subjected to the action of $SO_2$ so as to increase its content of "free" $SO_2$ to a predetermined relative concentration.

In a general way these process steps may be illustrated by the following equations:

*First step*

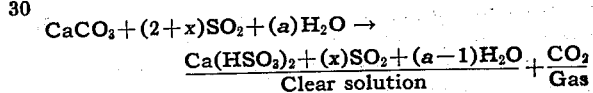

*Second step*

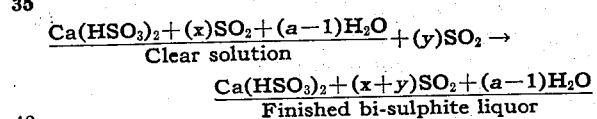

In a general way, also, the finished bi-sulphite liquor contains—

$SO_2$ as $Ca(HSO_3)_2$ (termed "bound" $SO_2$) =2%

$SO_2$ as $H_2SO_3$ (termed "free" $SO_2$) =1%

In a general way it is, however, desirable to employ, as reagents in the wood digesting process, bi-sulphite solutions of concentrations and compositions varied so as to be best suited to the treatment of the particular product being digested. Thus it is obvious that flexibility, as to actual and relative concentration of calcium and $SO_2$ as well as adequate and simple control over the production of said concentrations and compositions is a prime essential in any process for producing said solutions.

From the foregoing it is obvious that the first step in the operation may best be controlled primarily to produce solutions containing predetermined concentrations of calcium or, expressed otherwise, predetermined ratios of calcium and water. Further, this first step may best be controlled to yield solutions containing a minimum of variation in the concentration of the "free" or unbound $SO_2$ present therein to the end that the second step, the primary function of which is to introduce "free" $SO_2$ into the solution, may be most readily controlled to yield solutions containing predetermined concentrations of that ingredient or, expressed otherwise, predetermined ratios of $SO_2$ to calcium.

Thus, this invention has, for an objective, the control of this first step, especially in connection with the process as set forth in the above mentioned application for patent, to yield solutions in which the calcium and $SO_2$ are present in predetermined ratios.

The invention may be carried out as follows:—

A slurry comprising essentially finely pulverized limestone and water is introduced into a reaction zone as in an absorbing tower together with gases containing sulphur dioxide. In this reaction zone $SO_2$ is absorbed by the slurry and reacts with the limestone therein to produce a reaction-product slurry comprising essentially finely divided calcium-bearing solids suspended in an aqueous solution of calcium bi-sulphite and some free or unbound $SO_2$ to the end that said solution contains a predetermined concentration of $SO_2$ (bound plus unbound). This reaction-product slurry is withdrawn from this first zone of reaction into a second reaction zone, as into a tank equipped with an agitating device suitable for maintaining said slurry in the state of essentially a uniform mixture, wherein without the addition of further reagents, it is held preferably at a predetermined temperature, for a period during which its ingredients react to increase the calcium content of said solution toward a maximum and approach chemical equilibrium so as to yield a slurry in which said solution contains calcium and $SO_2$ in essentially a predetermined ratio to the end that said solution will contain a predetermined concentration of calcium. Following this period the resulting slurry is separated as by sedimentation into two portions, the first of which comprises the finely divided solids and a portion of the solution which slurry may be returned to the first of the above mentioned reaction zones while the other comprises the remaining portion of the solution in essentially a clear condition. This clear solution is subsequently subjected to the second step of the general process and thereby enriched in (unbound) $SO_2$ content to a predetermined point.

Thus the composition of the finished bi-sulphite liquor with respect to its content of calcium, of $SO_2$ bound thereto and of free $SO_2$ is dependably controlled in a simple manner.

The drawing illustrates a prefered method of applying this invention, in a diagrammatic manner. Herein a slurry comprising finely pulverized limestone suspended in water together with a second slurry from tank 5 via pump 6 comprising finely divided calcium bearing solids suspended in an aqueous solution containing calcium and $SO_2$, said second slurry having resulted from a previous operation of the process, are introduced in continuous manner at the top of a suitable absorbing tower 1 through which this mixture of said slurries flows downward. $SO_2$ bearing gases from a suitable supply are introduced at or near the bottom of tower 1 and flow upward therethrough to the exhauster 11. The reaction which proceeds in tower 1 is controlled primarily by manipulation of valves 9 and 10 but more especially by valve 10 to produce a reaction-product slurry the aqueous solution portion of which contains, as it flows continuously from the bottom of tower 1, a predetermined concentration of $SO_2$ part of which is chemically combined with calcium and part of which is "unbound" while the solid portion of said reaction product slurry comprises essentially calcium-bearing materials.

This reaction which proceeds in tower 1 is further controlled by varying the amount of said second slurry being introduced from tank 5, said variation being effected by manipulation of the by-pass valve 13, to the end that said mixture of slurries flowing through the tower may contain a concentration of finely divided calcium-bearing solids best suited to absorb $SO_2$ from the gases in the tower in producing said predetermined concentration of $SO_2$ in the solution portion of the tower effluent slurry. In a general way larger amounts of said second slurry are required to produce solutions containing higher concentrations of $SO_2$.

The slurry effluent from tower 1 is conveyed in a continuous manner to tank 2 which tank is substantially covered to prevent excessive loss of $SO_2$ from the slurry; is filled with slurry to a point of overflow, is equipped with an agitating device suitable for maintaining the slurry in a state of substantially uniform suspension and is of such a size that its fluid content will approximately equal the volume flowing from tower 1 during an hour. Tank 2 is further equipped with coils 12, or other suitable means, by which the temperature of its contents may be regulated at a desired point as by flowing steam or water of suitable temperatures through said coils. The reaction proceeding in said tank 2 may be described as one of equilibration in that the components of the slurry therein react so as to approach a state of chemical equilibrium and thereby tend to dissolve calcium so as to yield a maximum ratio between dissolved calcium and dissolved $SO_2$. Thus, since the concentration of $SO_2$ in the solution component of the tower effluent was controlled at a predetermined point it follows that the calcium content of the solution component of the slurry flowing from tank 2 is likewise controlled at a predetermined point.

The effluent from tank 2, overflowing in a continuous manner is conveyed to a thickener 3, preferably covered to avoid excessive losses of $SO_2$, in which the calcium-bearing solids settle to produce an essentially clear solution which, the thickener having been filled to a point of overflow, leaves the thickener as an overflow and is conveyed via pump 7 to the top of absorbing tower 8 wherein passing downward it is enriched by contact with $SO_2$ introduced near the bottom of said tower and passing upwards, its introduction being controlled by valve 9 so as to produce, as an effluent from the bottom of said tower 8, a clear solution containing a predetermined concentration of $SO_2$, both "free" and "bound", said effluent solution comprising finished bi-sulphite liquor.

The calcium-bearing solids which, as mentioned above, settle in thickener 3, are withdrawn as an underflow from the bottom of said thickener in the form of a slurry comprising, in addition to said solids, a portion of that aqueous solution which had been introduced into the thickener in the slurry from tank 2. This underflow is conveyed from the bottom of said thickener via pump 4 to storage tank 5 and thence via pump 6 to the top of tower 1 for purposes as previously described.

From the foregoing description it will be obvious that insoluble impurities which are introduced into the system or are formed therein will be retained in the circulatory system comprising tower 1, agitator 2, thickener 3 and storage or buffer tank 5. Further, that if such impurities are retained in said circulatory system, the process may ultimately become inoperative. Thus, provision is made to discard at intervals and in amounts as required to maintain control over the process, a portion of the thickener underflow slurry, as via valve 14 attached to the discharge from pump 6. This discarded slurry may be treated to recover valuable solution, as by filtration with washing, if desired.

Although we have in describing this invention, as above, mentioned only its application to the treatment of limestone and calcium-bearing materials, it is to be understood that it is likewise applicable to dolomitic limestones. Wherever the term limestone or natural limestone rock is employed in the claims, the same is to be broadly construed as comprehending any and all forms of limestone or limestone rock, regardless of whether it is pure limestone such as calcite or whether it is known as dolomitic limestone or magnesite which contain calcium and magnesium carbonates in various proportions.

While herein has been shown and described a system comprising a specific arrangement and kind of apparatus elements, and a specific example of a method of producing a desired product it is to be understood that the invention is not limited to such specific system and method but contemplates all such variants thereof as fairly fall within the scope of the appended claims.

We claim:

1. In a process of manufacturing bi-sulphite liquor employing the steps of intimately contacting in a reaction zone sulphur dioxide with a slurry comprising water and comminuted limestone rock in a manner such that a portion of said limestone will remain undissolved, withdrawing from said zone a reaction product slurry, and subsequently treating said reaction product slurry to essentially separate undissolved reactive solids from a portion of the solution therein, the step of intimately mixing the components of said withdrawn reaction product slurry in a second reaction zone and in the absence of a continued supply of sulphur dioxide, for a period of time prior to the said separation for purposes of dissolving additional of the reactive solids present therein.

2. In a process of manufacturing bi-sulphite liquor employing the steps of intimately contacting in a reaction zone sulphur dioxide with a slurry comprising (1) a slurry comprising comminuted limestone rock and water and (2) a slurry comprising reaction products from a previous operation of the process in a manner such that a portion of said limestone will remain undissolved, withdrawing from said zone a reaction product slurry, and subsequently treating said reaction product slurry to essentially separate undissolved reactive solids from a portion of the solution therein, said undissolved solids together with the remaining portion of said solution being returned to the above mentioned reaction zone, the step of intimately mixing the components of said withdrawn reaction-product slurry in a second reaction zone and in the absence of a continued supply of sulphur dioxide, for a period of time prior to said separation for purposes of dissolving additional of the reactive solids therein.

3. In a process of manufacturing raw bi-sulphite liquor, the steps of intimately contacting in a reaction zone an amount of sulphur dioxide with an amount of slurry said slurry comprising essentially water, finely comminuted limestone rock and finely divided solid reaction products from a previous operation of said steps which amount of slurry contains reactive solid phase material in excess of that which will dissolve through reaction with the $SO_2$ withdrawing the resulting slurry from said reaction zone, introducing said withdrawn slurry into a second reaction zone wherein its components are maintained as a substantially uniform mixture for a period of time and at predetermined temperatures for purposes of dissolving additional of the reaction solid materials therein to produce a reaction product slurry, withdrawing said reaction product slurry, treating said reaction-product slurry to separate a clear solution therefrom, and returning the separated reactive solids to the first of the above mentioned reaction zones.

4. In a process of manufacturing raw bi-sulphite liquor, the steps of intimately contacting in a continuous manner in a reaction zone an amount of $SO_2$ or $SO_2$—bearing gas with an amount of slurry, said slurry containing finely comminuted limestone rock, water, finely divided solid phase material from a previous cycle and an aqueous solution of reaction products also from a previous cycle, which amount of slurry contains reactive solid phase material in excess of that which will dissolve through reaction with the $SO_2$, withdrawing the resulting slurry from said reaction zone and introducing it into a second reaction zone wherein it is maintained in a condition suitable for preventing substantial settling of said solid phase material and thereby effecting substantially chemical equilibrium between its components, withdrawing said equilibrated slurry from said second reaction zone, separating a portion of the solution from said equilibrated slurry and continuously returning the remainder of said equilibrated slurry to the first reaction zone.

5. A process of manufacturing bi-sulphite liquor of predetermined characteristics said process consisting of intimately contacting in a first reaction zone an amount of $SO_2$ in an $SO_2$—bearing gas with an amount of a slurry comprising comminuted limestone rock and water together with an amount of a second slurry comprising an aqueous solution and solids resulting from a previous operation of the process, the amount of reactive solid materials in the combined slurries being in excess of that amount which will dissolve through reaction with said amount of $SO_2$ to produce a reaction-product slurry, then intimately mixing the components of said reaction-product slurry in a second reaction zone for a period of time at temperatures within a predetermined range and without the addition of further reagents for the purpose of dissolving additional of the reactive solids present therein, to produce essentially an equilibrated reaction-product slurry, then treating said equilibrated reaction-product slurry to separate undissolved reactive solids from a portion of the solution therein and to produce an essentially clear solution returning said undissolved solids together with the remaining portion of the solution to the first reaction zone above described, then subjecting said clear portion of solution to the action of $SO_2$.

6. In a process of manufacturing raw bi-sulphite liquor, the steps of intimately contacting in a reaction zone an amount of sulphur dioxide with an amount of slurry, said slurry comprising essentially water, finely comminuted limestone rock and reaction products from a previous operation of said steps, which amount of slurry contains reactive solid phase material in excess of that which will dissolve through reaction with the $SO_2$, withdrawing the resulting slurry from said reaction zone, introducing said withdrawn slurry into a second reaction zone wherein its components are maintained as a substantially uniform mixture for a period of time and at predetermined temperatures for purposes of dissolving additional of the reaction solid materials therein to produce a reaction product slurry, withdrawing said reaction product slurry, and treating said reaction product slurry to separate a clear solution therefrom.

ALVAH L. MILLER.
RALPH W. SHAFOR.
GEORGE M. DARBY.